(12) United States Patent
Faers et al.

(10) Patent No.: US 12,145,728 B2
(45) Date of Patent: Nov. 19, 2024

(54) AERIAL VEHICLE

(71) Applicant: BAYER AKTIENGESELLSCHAFT, Leverkusen (DE)

(72) Inventors: Malcolm Faers, Düsseldorf (DE); Andrew Charles Chapple, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 316 days.

(21) Appl. No.: 17/765,700

(22) PCT Filed: Oct. 2, 2020

(86) PCT No.: PCT/EP2020/077621
§ 371 (c)(1),
(2) Date: Mar. 31, 2022

(87) PCT Pub. No.: WO2021/069316
PCT Pub. Date: Apr. 15, 2021

(65) Prior Publication Data
US 2022/0340277 A1   Oct. 27, 2022

(30) Foreign Application Priority Data

Oct. 10, 2019 (EP) .................................... 19202441

(51) Int. Cl.
*B64D 1/18* (2006.01)
*A01M 7/00* (2006.01)
(Continued)

(52) U.S. Cl.
CPC ............. *B64D 1/18* (2013.01); *A01M 7/0042* (2013.01); *A01M 7/0089* (2013.01);
(Continued)

(58) Field of Classification Search
CPC ...................... B64U 2101/00; B64U 2101/45; B64U 10/10; B64U 2201/10; B64D 1/18; A01M 7/0089
(Continued)

(56) References Cited

U.S. PATENT DOCUMENTS 11,726,479 B2 * 8/2023 Norcia ................... B64U 50/13
244/13
2016/0214715 A1 * 7/2016 Meffert ................... G01S 17/88
(Continued)

FOREIGN PATENT DOCUMENTS

CN  104977935       10/2015
CN  104977935 A  *  10/2015
(Continued)

OTHER PUBLICATIONS

Evaluation of aerial spraying application of multi-rotor unmanned aerial vehicle for Areca catechu protection; Frontiers in Plant Science; DOI 10.3389/fpls.2023.1093912; Wang et al.; 16 pages; Published on Feb. 28, 2023.*

(Continued)

*Primary Examiner* — Ronald D Hartman, Jr.
(74) *Attorney, Agent, or Firm* — Harness, Dickey & Pierce, P.L.C.

(57) ABSTRACT

The present invention relates to an aerial vehicle (10). aerial vehicle comprises a liquid chemical tank (20), at least one liquid spray unit (30), at least one actuator (40), a plurality of sensors (50), and a processing unit (60). The liquid chemical tank is configured to hold a liquid chemical. The at least one liquid spray unit is configured to spray the liquid chemical. The at least one actuator is configured to operate the at least one liquid spray unit. At least one sensor (51) of the plurality of sensors is configured to measure a speed of (Continued)

the aerial vehicle relative to the ground. At least one sensor (52) of the plurality of sensors is a light detection and ranging (LIDAR) sensor configured to measure the direction and distance of airborne particles relative to the aerial vehicle with respect to a fore-aft axis of the aerial vehicle. The processing unit is configured to determine an air movement direction and distance relative to a projection of the fore-aft axis onto the ground and determine an air movement speed relative to the ground. The determination comprises utilisation of the speed of the aerial vehicle, the direction and distance of airborne particles relative to the aerial vehicle with respect to the fore-aft axis of the aerial vehicle and the speed of airborne particles relative to the aerial vehicle. The processing unit is configured to control at least one flying operation of the aerial vehicle and/or control the at least one actuator. Determination of at least one instruction for the control of the at least one flying operation of the aerial vehicle and/or determination of at least one instruction for the control the at least one actuator comprises utilisation of the determined air movement direction and distance relative to the projection of the fore-aft axis onto the ground and the determined air movement speed relative to the ground.

16 Claims, 7 Drawing Sheets

(51) Int. Cl.

| | |
|---|---|
| *B64D 47/00* | (2006.01) |
| *B64U 10/00* | (2023.01) |
| *B64U 101/30* | (2023.01) |
| *B64U 101/40* | (2023.01) |
| *B64U 101/45* | (2023.01) |
| *G05D 1/00* | (2024.01) |

(52) U.S. Cl.
CPC .......... *B64D 47/00* (2013.01); *G05D 1/0094* (2013.01); *G05D 1/101* (2013.01); *B64U 10/00* (2023.01); *B64U 2101/30* (2023.01); *B64U 2101/40* (2023.01); *B64U 2101/45* (2023.01); *B64U 2201/00* (2023.01); *B64U 2201/10* (2023.01)

(58) Field of Classification Search
USPC .......................................................... 700/283
See application file for complete search history.

(56) References Cited

U.S. PATENT DOCUMENTS

| | | | | |
|---|---|---|---|---|
| 2018/0093284 | A1* | 4/2018 | Harris | B64D 1/18 |
| 2018/0354624 | A1* | 12/2018 | Liu | A01C 23/047 |
| 2020/0047208 | A1* | 2/2020 | Dagan | A01C 23/047 |
| 2020/0260714 | A1* | 8/2020 | Pleatman | A01M 21/043 |
| 2020/0348698 | A1* | 11/2020 | Wake | B64D 27/24 |
| 2021/0245880 | A1* | 8/2021 | Yan | G06N 3/08 |
| 2023/0331406 | A1* | 10/2023 | Amianti | B64D 1/00 |

FOREIGN PATENT DOCUMENTS

| | | | | |
|---|---|---|---|---|
| DE | 102018221468 | A1 * | 6/2020 | |
| DE | 102018104827 | B4 * | 11/2022 | B64C 39/04 |
| EP | 3440930 | | 2/2019 | |
| EP | 3440930 | A1 * | 2/2019 | A01B 69/008 |
| WO | WO 2016/192024 | | 12/2016 | |
| WO | WO-2016192024 | A1 * | 12/2016 | A01M 7/00 |
| WO | WO 2018/157393 | | 9/2018 | |
| WO | WO-2018157393 | A1 * | 9/2018 | B05B 13/005 |
| WO | WO-2021216379 | A2 * | 10/2021 | A01M 7/0032 |

OTHER PUBLICATIONS

Recent development of unmanned aeiral vehicle for plant protection in East Asia; Int J Agric and Biol Eng; vol. 10, No. 3; Xiongkui et al.; Published May 2017; 27 pages.*
Unmanned aerial system plant protection products spraying performance evaluation on a vineyard; Sassu et al.; Precision Agriculture; doi.org/10.1007/s11119-024-10155-8; Publiashed May 24; 31 pages.*
Drones for Spraying Pesticides—Opportunities and Challenges; Ohio State University; Published on Jan. 17, 2024; 18 pages.*

* cited by examiner

Fig. 6 wind

Deposition, coarse droplets

Deposition, fine droplets

AERIAL VEHICLE

CROSS-REFERENCE TO RELATED APPLICATIONS

This application is a U.S. national stage filing under 35 U.S.C. § 371 of International Application No. PCT/EP2020/077621, filed on Oct. 2, 2020, which claims the benefit of, and priority to, European Patent Application No. 19202441.2, filed on Oct. 10, 2019. The entire disclosure of each of the above applications is incorporated herein by reference.

FIELD OF THE INVENTION

The present invention relates to an aerial vehicle.

BACKGROUND OF THE INVENTION

Spray drift caused by wind and wind gusts is a major problem in agricultural production. The spray droplets drift onto non target surfaces, such as within sensitive zones, on bystanders, onto water bodies, and onto neighboring fields. Wind speed and direction are not constant but vary in time (from seconds to hours) and spatially in all three dimensions, caused by, for example from obstructions on the ground, surface friction from the ground or crop, and thermal variations in the ground and air temperature. An obstacle with a height of 1 m can produce eddies which extend for up to 10 m or more downwind and can reach a height of 2 m (depending on other factors, e.g., wind speed), and for larger obstacles such as trees and buildings, such eddies can extend considerably further and higher. Since aerial vehicles such as drones commonly fly at and apply product from a height of 1 to 2 m or greater, even small obstacles or changes in landscape structure can have significant effects on the structure of the wind in the flight path of the aerial vehicle, particularly when upwind effects are combined with target area changes (a rolling landscape, patchy crop drilling, lodging, etc.). Because of this an aerial vehicle can deviate from an optimal flight path and the spray can deviate from its intended deposition target.

There is a need to address this problem

SUMMARY OF THE INVENTION

It would be advantageous to have a way of mitigating the effects of spray drift.

The object of the present invention is solved with the subject matter of the independent claims, wherein further embodiments are incorporated in the dependent claims.

In an aspect, there is provided an aerial vehicle, comprising:
a liquid chemical tank;
at least one liquid spray unit;
at least one actuator;
a plurality of sensors; and
a processing unit.

The liquid chemical tank is configured to hold a liquid chemical. The at least one liquid spray unit is configured to spray the liquid chemical. The at least one actuator is configured to operate the at least one liquid spray unit. At least one sensor of the plurality of sensors is configured to measure a speed of the aerial vehicle relative to the ground. At least one sensor of the plurality of sensors is a light detection and ranging (LIDAR) sensor configured to measure the direction, distance and speed of airborne particles relative to the aerial vehicle with respect to a fore-aft axis of the aerial vehicle. The processing unit is configured to receive and analyse the sensor data from the plurality of sensors to determine an air movement direction and distance relative to a projection of the fore-aft axis onto the ground and to determine an air movement speed relative to the ground. The determination comprises utilisation of the speed of the aerial vehicle, the direction and distance of airborne particles relative to the aerial vehicle with respect to the fore-aft axis of the aerial vehicle and the speed of airborne particles relative to the aerial vehicle. The processing unit is configured to control at least one flying operation of the aerial vehicle and/or control the at least one actuator. Determination of at least one instruction for the control of the at least one flying operation of the aerial vehicle and/or determination of at least one instruction for the control of the at least one actuator comprises utilisation of the determined air movement direction and distance relative to the projection of the fore-aft axis onto the ground and the determined air movement speed relative to the ground.

In other words, a light detection and ranging (LIDAR) sensor housed within/attached to the aerial vehicle detects the direction, distance and speed of airborne particles e.g. in a range of about 1 to 100 meters and greater around the vehicle with respect to the aerial vehicle's frame of reference that can be moving, and especially including the region in the immediate flight path of the aerial vehicle. The LIDAR sensor data allows a processing unit to determine air movement (wind) speed and air movement (wind) direction and air movement (wind) distance based on the movement of the airborne particles over time (together with the determined information of the air movement speed and direction of the aerial vehicle with respect to the ground). This information is then used to control how the aerial vehicle, that can be moving, sprays a chemical liquid.

In this manner, the effect of drift of a sprayed liquid caused by wind can be mitigated through control of the aerial vehicle and/or control of the liquid spray units themselves, with this mitigation taking into account the real wind speed, direction and distance. In comparison to other wind sensors, LIDAR allows operation of the spray vehicle with a more foresight-oriented strategy and therefore more precision. Thus, an aerial vehicle can spray closer to the edge of fields and/or closer to footpaths, or areas that are not to be sprayed, and/or spraying can be conducted at higher aerial vehicle speeds and at higher wind speeds than currently achievable, while remaining within the legally required limits for that spray application operation. In this manner, it can also be avoided that certain areas are sprayed twice while some parts of the field are not be sprayed at all.

Thus, spray drift can be mitigated taking into account wind direction, distance and speed, and combining the various aspects of drift mitigation (e.g., spray height, crop foliage density, off-crop foliage interception, drop size distribution).

Reference above to a liquid chemical tank and a liquid chemical, does not preclude there being two tanks holding different liquids or a liquid and a solid, such as a powder, where the contents of those two tanks are then mixed and then sprayed as a liquid chemical. Thus, at one level the liquid chemical tank can be a tube connected to the liquid spray unit that sprays the liquid chemical held in that tube, even if two different fluids, or a fluid and solid, are mixed beforehand and then provided to the connecting tube as the liquid chemical that is then sprayed.

Also, a liquid spray unit refers to a spray device, such as a spray nozzle and/or spinning disc atomiser, of any description or type. In a preferred embodiment, the liquid spray unit refers to a spinning disc (atomiser) liquid spray unit.

In an example, the term "chemical liquid(s)" refers to liquid(s) comprising chemical and/or biological based agricultural active ingredients such as e.g. herbicides, insecticides, fungicides, crop nutritional agents, biostimulants, plant growth regulators etc.

In an example, control of the at least one flying operation comprises varying a height of the aerial vehicle above the ground or the varying the horizontal position which extends in a direction perpendicular to the fore-aft axis of the aerial vehicle above the ground or crop (and extends in a direction perpendicular to the vertical axis and parallel to the ground or crop).

Thus, in this way as the wind speed and/or direction would lead to more spray drift, for example in a lateral direction perpendicular to a movement direction of the aerial vehicle, the aerial vehicle can fly lower and/or the aerial vehicle can fly upwind if spray drift is expected to increase, as a consequence of the wind speed increasing and/or the wind direction moving in a direction more perpendicular to the aerial vehicle movement direction, which can become important when an aerial vehicle is spraying at the boundary of a field and is flying parallel to that boundary.

In other words, if the wind speed and direction is such that unwanted spray drift could occur, spraying can be conducted at a reduced height above the ground or height above the crop leading to less drift as the spray has less time to travel from a liquid spray unit to the ground or crop thus there is less spray drift. Alternatively, or in combination with this drift mitigation measure the horizontal position of the aerial vehicle can be changed e.g. more toward an upwind direction if the wind speed is increasing. The distances of the air movements relative to the aerial vehicle are also considered in order to mitigate e.g. turbulences in the air that are coming down into the flight path.

In an example, at least one sensor of the plurality of sensors is configured to provide data from which a height of the aerial vehicle above the ground or height above the crop can be determined. The processing unit is configured to fly the aerial vehicle to a height above the ground or crop that depends on a magnitude of the determined air movement speed relative to the ground.

In this manner, the liquid spray unit(s) can be positioned at the ideal position to mitigate spray drift, taking into account wind speed.

In an example, at least one sensor of the plurality of sensors is configured to provide data from which a horizontal position which extends in a direction perpendicular to the fore-aft axis of the aerial vehicle above the ground or crop (and parallel to the ground or crop) can be determined. The processing unit is configured to fly the aerial vehicle to the horizontal position above the ground or crop that depends on a magnitude of the determined air movement speed relative to the ground.

In this manner, the liquid spray unit(s) can be positioned at the ideal position to avoid spray drift to unwanted areas, taking into account wind speed.

In an example, the processing unit is configured to fly the aerial vehicle at a height above the ground or crop and/or to fly the aerial vehicle to a horizontal position above the ground or crop that depends on a magnitude of an air direction angle of the determined air movement direction relative to the projection of the fore-aft axis onto the ground.

In this manner, the liquid spray unit(s) can be positioned at the ideal position to mitigate spray drift and/or to avoid spray drift to unwanted areas, taking into account wind direction.

In an example, the height above the ground or crop at which the aerial vehicle is flown is calculated on the basis of the air movement speed relative to the ground multiplied by the cosine of the air direction angle.

In other words, the effect of cross-winds or a component of wind that is perpendicular to the forward movement direction of the aerial vehicle of spray drift can be mitigated through appropriate control of the height of aerial vehicle.

In an example, the horizontal position above the ground or crop at which the aerial vehicle is flown is determined at least in part on the air movement speed relative to the ground multiplied by the cosine of the air direction angle.

In other words, the effect of cross-winds or a component of wind that is perpendicular to the forward movement direction of the aerial vehicle of spray drift to unwanted areas can be mitigated through appropriate control of the horizontal position of the aerial vehicle relative to the ground.

In an example, the at least one actuator comprises at least one activation actuator configured to start the at least one liquid spray unit spraying the liquid chemical and configured to stop the at least one liquid spray unit spraying the liquid chemical. Thus, the at least one actuator being configured to operate the at least one liquid spray unit comprises the at least one activation actuator being configured to stop the at least one liquid spray unit from spraying, and indeed to start it spraying again.

In an example, the processing unit is configured to control one or more of the at least one activation actuator to stop an equivalent number of liquid spray units from spraying the liquid chemical based at least in part on a magnitude of the determined air movement speed relative to the ground.

In this manner, when the wind speed in combination with its direction would lead to a situation where spray from one or more liquid spray units could cause problematic spray drift, those units can be turned off. Thus, for example an aerial vehicle can operate on the margins of a field and gusting wind that would cause spray from liquid spray units to cross over the border of the field can be mitigated by turning off those liquid spray units.

In an example, the at least one actuator comprises at least one spray adjustment actuator configured to control a droplet size of the liquid chemical sprayed by the at least one liquid spray unit.

Thus, the at least one actuator being configured to operate the at least one liquid spray unit comprises the at least one spray adjustment actuator being configured to control a droplet sized sprayed by the at least one liquid spray unit.

In an example, the processing unit is configured to control one or more of the at least one spray adjustment actuator to control the droplet size of the liquid chemical sprayed by an equivalent number of liquid spray units based at least in part on a magnitude of the determined air movement speed relative to the projection of the fore-aft axis of the aerial vehicle onto the ground.

In an example, the processing unit is configured to increase the droplet size on the basis of an increase in the magnitude of the determined air movement speed relative to the ground.

In this manner, as the wind speed and/or direction would otherwise lead to problematic spray drift, the sprayed drop size can be increased in order to mitigate spray drift, because larger spray droplets suffer from less drift in comparison to smaller spray droplets.

In an example, the processing unit is configured to control one or more of the at least one spray adjustment actuator to control the droplet size of the liquid chemical sprayed by an equivalent number of liquid spray units based at least in part on a magnitude of an air direction angle of the determined air movement direction relative to the projection of the fore-aft axis of the aerial vehicle onto the ground. The air direction angle is the angle between the determined air movement direction relative to the projection of the fore-aft axis of the aerial vehicle onto the ground and the projection of the fore-aft axis of the aerial vehicle onto the ground.

In an example, the droplet size is determined at least in part on the air movement speed relative to the ground multiplied by the cosine of the air direction angle.

In an example, the aerial vehicle further comprises at least one sensor configured to acquire at least one image above the ground or crop.

In this manner, the LIDAR data can be supplemented by one or more images acquired from the surrounding above the ground or crop. The processing unit can fuse the LIDAR data and the image data. This is advantageous at the crop canopy—air boundary where the crop canopy may interfere with the LIDAR detection.

In the above, where it is described that the processing unit is configured to control an actuator, and/or a flying operation of the aerial vehicle, this relates to the processing unit determining instructions for that control. For example, the processing unit can determine instructions in the form of signals that are used to operate an actuator. For example, the processing unit can determine instructions for flying the aerial vehicle in a certain manner. This could be in the form of signals that are directly used to fly the aerial vehicle, or in the form of signals that are provided to a dedicated flight control unit that then flies the aerial vehicle as required.

The above aspects and examples will become apparent from and be elucidated with reference to the embodiments described hereinafter.

BRIEF DESCRIPTION OF THE DRAWINGS

Exemplary embodiments will be described in the following with reference to the following drawings:

FIG. 6 shows a schematic example of a spinning disc as part of an aerial vehicle and the influence of the change of rotational speed of the spinning disc on the droplet size of the sprayed liquid.

FIG. 7 shows a schematic example of the influence of droplet size of the sprayed liquid on spray drift.

FIG. 8 shows a schematic example of a plane view of a flying route of an aerial vehicle and the adjustment of the rotational speed of the spinning disc and the droplet size of the sprayed liquid during flight.

DETAILED DESCRIPTION OF EMBODIMENTS

Figure 1:
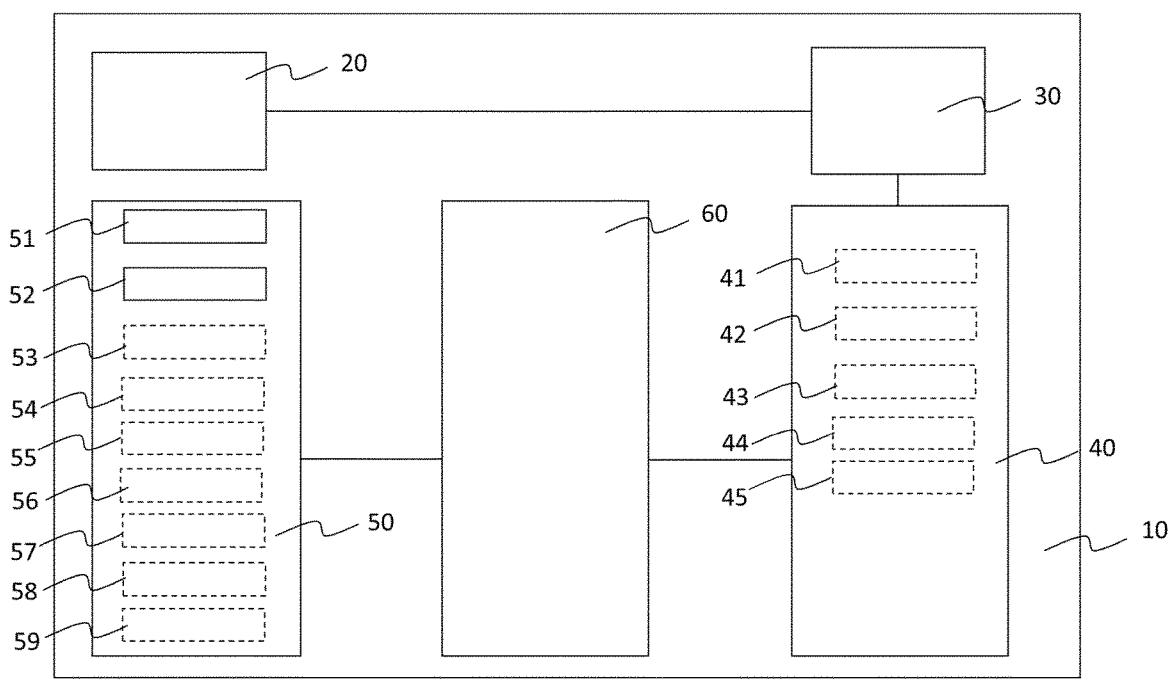
FIG. 1 shows a schematic set up of an example of an aerial vehicle.

FIG. 1 shows an example of an aerial vehicle 10. The aerial vehicle comprises a liquid chemical tank 20, at least one liquid spray unit 30, at least one actuator 40, a plurality of sensors 50, and a processing unit 60. The liquid chemical tank is configured to hold a liquid chemical. The at least one liquid spray unit is configured to spray the liquid chemical. The at least one actuator is configured to operate the at least one liquid spray unit. At least one sensor 51 of the plurality of sensors is configured to measure a speed of the aerial vehicle relative to the ground. At least one sensor 52 of the plurality of sensors is a light detection and ranging (LIDAR) sensor configured to measure the direction, distance and speed of airborne particles relative to the aerial vehicle with respect to a fore-aft axis of the aerial vehicle. The processing unit is configured to determine an air movement direction and distance relative to a projection of the fore-aft axis onto the ground and determine an air movement speed relative to the ground. The determination comprises utilisation of the speed of the aerial vehicle, the direction and distance of airborne particles relative to the aerial vehicle with respect to the fore-aft axis of the aerial vehicle and the speed of airborne particles relative to the aerial vehicle. The processing unit is configured to control at least one flying operation of the aerial vehicle and/or control the at least one actuator. Determination of at least one instruction for the control of the at least one flying operation of the aerial vehicle and/or determination of at least one instruction for the control the at least one actuator comprises utilisation of the determined air movement direction and distance relative to the projection of the fore-aft axis onto the ground and the determined air movement speed relative to the ground.

In an example, the at least one sensor 51 configured to measure a speed of the aerial vehicle relative to the ground comprises a GPS system.

In an example, the at least one sensor 51 configured to measure a speed of the aerial vehicle relative to the ground comprises a laser reflectance-based system.

In an example, the at least one sensor 52 is a LIDAR sensor. A LIDAR sensor is configured to measure the wind (air movement) speed and direction over a range of distances. LIDAR is based on the principle of light detection and ranging. An application of this technique uses the Doppler shift (change in wavelength) to determine the velocity difference of backscattered light from airborne particles and is known as Doppler LIDAR. The distance is determined from the time delay from a light pulse from a laser (pulsed laser technique), calculated from the speed of light in air. The relative speed to the aerial vehicle is determined from the frequency shift of the reflected laser pulse. By scanning the pulse across the target space and combining all the information, a 3D wind (air movement) direction, distance and speed map can be obtained and by continuously scanning the target space, the 3D wind direction, distance and speed map can be continuously updated to give an almost real time map of how the wind is moving around and especially ahead of the aerial vehicle.

In an example, the at least one sensor 52 is a Doppler LIDAR sensor

In an example, the LIDAR sensor is configured to measure the direction, distance and speed of airborne particles relative to the aerial vehicle with respect to a fore-aft axis of the aerial vehicle in form of a three-dimensional (3D) vision cone (a 3D volume) extending towards the flying direction of the aerial vehicle.

In an example, the LIDAR sensor uses a continuous working (CW) laser and a 2D camera sensor array according to the Scheimpflug principle. In this system the sensor array is angled to the laser beam, allowing a wide range of distances to be in focus at the same time. This is commonly referred to as Scheimpflug LIDAR or SLIDAR. An advantage of this is that it is much smaller, can use more simple lasers, and is easier to mount on an aerial vehicle. Sensors can use synthetic array heterodyne detection (SAPID) which overcomes the need for array detectors.

In an example, the wavelength of light used in LIDAR can range for example from 200 nm up to 2500 nm and above. Wavelengths between 600 nm to 2000 nm are preferred, more especially outside the visual region between 900 nm to 2000 nm where eye safety is improved.

In an example, the LIDAR signal is generated by a phased array. An advantage of a solid-state phased array is its small size, long life, and low energy requirements making it ideal for mounting on an aerial vehicle.

In an example, the LIDAR signal detection range from distances below 1 m to distances greater than 1 km. The preferred airborne particles distance and air movement distance range detection for this invention is from 1 meter up to 500 meters, more preferably 1 meter up to 100 meters.

In an example, the airborne particles include one or more of aerosols, dirt particles, vegetation particles, trash particles and small objects.

In an example, the at least one liquid spray unit is a spinning disc liquid spray unit.

According to an example, control of the at least one flying operation comprises varying a height of the aerial vehicle above the ground or crop or the horizontal position which extends in a direction perpendicular to the fore-aft axis of the aerial vehicle above the ground or crop (and parallel to the ground or crop).

In an example, control of at least two flying operations comprises varying a height of the aerial vehicle above the ground or crop and (preferably concurrently) varying the horizontal position which extends in a direction perpendicular to the fore-aft-axis of the aerial vehicle above the ground or crop (and parallel to the ground or crop).

According to an example, at least one sensor 53 of the plurality of sensors is configured to provide data from which a height of the aerial vehicle above the ground or crop can be determined. The processing unit is configured to fly the aerial vehicle to a height above the ground or crop that depends on a magnitude of the determined air movement speed relative to the ground.

In an example, the sensor used to determine height is a radar sensor.

In an example, the sensor used to determine height is a laser time of flight sensor.

According to an example, at least one sensor 54 of the plurality of sensors is configured to provide data from which a horizontal position which extends in a direction perpendicular to the fore-aft axis of the aerial vehicle above the ground or crop can be determined. The processing unit is configured to fly the aerial vehicle to the horizontal position above the ground or crop that depends on a magnitude of the determined air movement speed relative to the ground.

In an example, the sensor used to determine horizontal position comprises a GPS system.

In an example, the at least one sensor 55 is configured to determine the height of a liquid spray unit above the ground or crop. For example, the liquid spray unit could be moveable with respect to body of the aerial vehicle, for example being mounted on a telescopic extension below the aerial vehicle.

According to an example, the processing unit is configured to fly the aerial vehicle at a height above the ground or crop and/or to fly the aerial vehicle to a horizontal position above the ground or crop that depends on a magnitude of an air direction angle of the determined air movement direction relative to the projection of the fore-aft axis onto the ground.

According to an example, the height above the ground or crop at which the aerial vehicle is flown is calculated on the basis of the air movement speed relative to the ground multiplied by the cosine of the air direction angle.

According to an example, the horizontal position above the ground or crop at which the aerial vehicle is flown is determined at least in part on the air movement speed relative to the ground multiplied by the cosine of the air direction angle.

In an example, the processing unit is configured to fly the aerial vehicle at a height above the ground or crop and/or to fly the aerial vehicle to a horizontal position above the ground or crop that depends on the determined air movement direction and distance relative to the projection of the fore-aft axis of the aerial vehicle onto the ground and the determined air movement speed relative to the ground.

In an example, the processing unit is configured to fly the aerial vehicle in a downwards direction when the magnitude of the determined air movement speed relative to the ground exceeds one or more threshold values.

In this manner, spraying can continue in a set manner until a wind speed exceeds a set magnitude, and then remedial action can be undertaken for this situation when spray drift can become problematic. This saves energy, and also mitigates the possibility of hunting, where the system could be continuously seeking an optimum setting.

In an example, the processing unit is configured to fly the aerial vehicle in upwind horizontal direction when the magnitude of the determined air movement speed relative to the ground exceeds one or more threshold values.

In an example, the one or more threshold values depend upon a magnitude of an air direction angle. The air direction angle is the angle between the determined air movement direction relative to the ground and the projection of the fore-aft axis of the aerial vehicle onto the ground.

In an example, the one or more threshold values are a plurality of threshold values. A threshold value of the plurality of threshold values is calculated on the basis of a set air movement speed multiplied by the cosine of the air direction angle.

In an example, the at least one liquid spray unit is movably attached to the aerial vehicle. At least one sensor 56 of the plurality of sensors is configured to provide data from which an angle of the at least one liquid spray unit with respect to a vertical axis can be determined. The at least one actuator 40 comprises at least one first rotator actuator 43 configured to rotate the at least one liquid spray unit by at least one angle of rotation with respect to the vertical axis. The processing unit is configured to control one or more of the at least one first rotator actuator to rotate one or more of the at least one liquid spray unit.

In an example, a horizontal axis extends in a direction perpendicular to the fore-aft axis of the aerial vehicle and extends in a direction perpendicular to the vertical axis. At least one sensor 57 of the plurality of sensors is configured to provide data from which an angle of the at least one liquid spray unit with respect to the horizontal axis can be determined. The at least one actuator 40 comprises at least one second rotator actuator 44 configured to rotate the at least one liquid spray unit by at least one angle of rotation with respect to the horizontal axis. The processing unit is configured to control one or more of the at least one second rotator actuator to rotate one or more of the at least one liquid spray unit.

In an example, the processing unit is configured to control the at least one first rotator actuator to rotate the at least one liquid spray unit in unison by a same angle of rotation with respect to the vertical axis.

In an example, the processing unit is configured to control the at least one second rotator actuator to rotate the at least one liquid spray unit in unison by a same angle of rotation with respect to the horizontal axis.

In an example, control of the at least one actuator by the processing unit comprises utilisation of a magnitude of the determined air movement speed relative to the ground.

In an example, control of the at least one actuator by the processing unit comprises utilisation of a magnitude of an air direction angle of the determined air movement direction relative to the projection of the fore-aft axis onto the ground. The air direction angle is the angle between the determined air movement direction relative to the projection of the fore-aft axis onto the ground and the projection of the fore-aft axis of the aerial vehicle onto the ground.

In an example, the at least one angle of rotation with respect to the vertical axis is based at least in part on the air movement speed relative to the ground multiplied by the cosine of the air direction angle.

In an example, the control of the at least one actuator by the processing unit comprises utilization of the determined air movement direction and distance relative to the projection of the fore-aft axis of the aerial vehicle onto the ground and the determined air movement speed relative to the ground.

According to an example, the at least one actuator comprises at least one activation actuator 41 configured to start the at least one liquid spray unit spraying the liquid chemical and configured to stop the at least one liquid spray unit spraying the liquid chemical.

According to an example, the processing unit is configured to control one or more of the at least one activation actuator to stop an equivalent number of liquid spray units from spraying the liquid chemical based at least in part on a magnitude of the determined air movement speed relative to the ground.

In an example, the processing unit is configured to control one or more of the at least one activation actuator to stop an equivalent number of liquid spray units from spraying the liquid chemical based at least in part on a magnitude of an air direction angle of the determined air movement direction relative to the projection of the fore-aft axis onto the ground. The air direction angle is the angle between the determined air movement direction relative to the projection of the fore-aft axis onto the ground and the projection of the fore-aft axis of the aerial vehicle onto the ground.

In an example, the determination to stop a liquid spray unit from spraying is based at least in part on the air movement speed relative to the ground multiplied by the cosine of the air direction angle.

In an example, the determination to stop a liquid spray unit from spraying by the processing unit comprises utilization of the determined air movement direction and distance relative to the projection of the fore-aft axis of the aerial vehicle onto the ground and the determined air movement speed relative to the ground.

According to an example, the at least one actuator comprises at least one spray adjustment actuator 42 configured to control a droplet size of the liquid chemical sprayed by the at least one liquid spray unit. In an example, the at least one spray adjustment actuator is configured to control the droplet size by changing the rotational speed or revolutions per minutes (RPM) of the at least one liquid spray unit when the at least one liquid spray unit is a spinning disc (atomizer) liquid spray unit.

In an example, the at least one spray adjustment actuator is configured to control the droplet size by varying the liquid pressure of the at least one liquid spray unit when the at least one liquid spray unit comprises a spray nozzle.

In an example, the processing unit is configured to control at least one spray adjustment actuator to control the droplet size of the liquid sprayed based at least in part on the determined air movement direction and distance relative to the projection of the fore-aft axis of the aerial vehicle onto the ground and the determined air movement speed relative to the ground.

According to an example, the processing unit is configured to control one or more of the at least one spray adjustment actuator to control the droplet size of the liquid chemical sprayed by an equivalent number of liquid spray units based at least in part on a magnitude of the determined air movement speed relative to the projection of the fore-aft axis of the aerial vehicle onto the ground.

According to an example, the processing unit is configured to control one or more of the at least one spray adjustment actuator to increase the droplet size on the basis of an increase in the magnitude of the determined air movement speed relative to the ground.

According to an example, the processing unit is configured to control one or more of the at least one spray adjustment actuator to control the droplet size of the liquid chemical sprayed by an equivalent number of liquid spray units based at least in part on a magnitude of an air direction angle of the determined air movement direction relative to the projection of the fore-aft axis of the aerial vehicle onto the ground. The air direction angle is the angle between the determined air movement direction relative to the projection of the fore-aft axis of the aerial vehicle onto the ground and the projection of the fore-aft axis of the aerial vehicle onto the ground According to an example, the droplet size is determined at least in part on the air movement speed relative to the ground multiplied by the cosine of the air direction angle.

In an example, the at least one liquid spray unit is movably attached to the aerial vehicle. The at least one liquid spray unit is configured to be moved away from and toward a body of the aerial vehicle. The at least one actuator comprises at least one extension actuator 45 configured to move the at least one liquid spray unit away from and toward the body of the aerial vehicle. Control of the at least one actuator comprises controlling the at least one extension actuator to vary a height of the at least one liquid spray unit above the ground or crop.

In an example, the liquid spray unit(s) is (are) mounted on a telescopic extendable and retractable mount beneath the aerial vehicle, enabling the distance between the liquid spray unit(s) and body of the aerial vehicle to be varied. Thus, the aerial vehicle can be flown at a constant height above the ground or crop, and at the same time the liquid spray unit's height above the ground or crop can be varied. In this way, as the possibility of spray drift increases, one way to mitigate this is spray from a lower height, by varying the height of the liquid spray unit but keeping the aerial vehicle at an optimum flight height. The liquid sprayed, is then in the air for a reduced time and consequently has less time to drift laterally, thereby mitigating spray drift.

In an example, a sensor measures a distance of the liquid spray unit below the body of the aerial vehicle, and therefore by knowing the height of the body of the aerial vehicle above the ground or crop through use of an appropriate sensor, the height of the liquid spray unit above the ground or crop can be determined.

In an example, at least one sensor 58 of the plurality of sensors is configured to provide data from which a height of the at least one liquid spray unit above the ground or crop can be determined. The processing unit is configured to control the at least one extension actuator to position the at least one liquid spray unit at a height above the ground or crop that depends on a magnitude of the determined air movement speed relative to the ground or crop.

In an example, the processing unit is configured to control the at least one extension actuator based at least in part on the determined air movement direction and distance relative to the projection of the fore-aft axis of the aerial vehicle onto the ground and the determined air movement speed relative to the ground.

In an example, the sensor 58 used to determine height is a radar sensor.

In an example, the sensor 58 used to determine height is a laser time of flight sensor.

In an example, the processing unit is configured to control the at least one extension actuator to position the at least one liquid spray unit at a height above the ground or crop that depends on a magnitude of an air direction angle of the determined air movement direction relative to the projection of the fore-aft axis onto the ground.

In an example, the height above the ground or crop at which the at least one liquid spray unit is positioned is calculated on the basis of the air movement speed relative to the ground multiplied by the cosine of the air direction angle.

In an example, the processing unit is configured to control the at least one extension actuator to move the at least one liquid spray unit in a downwards direction when the magnitude of the determined air movement speed relative to the ground exceeds one or more threshold values.

In an example, the one or more threshold values depend upon a magnitude of an air direction angle. The air direction angle is the angle between the determined air movement direction relative to the ground and the projection of the fore-aft axis of the aerial vehicle onto the ground.

In an example, the one or more threshold values are a plurality of threshold values. A threshold value of the plurality of threshold values is calculated on the basis of a set air movement speed multiplied by the cosine of the air direction angle.

According to an example, the aerial vehicle further comprises at least one sensor 59 configured to acquire at least one image above the ground or crop.

In an example, the sensor 59 is a camera. The processing unit can fuse/supplement the data from the LIDAR sensor and the camera image data to continuously generate an updated wind (air movement) speed, distance and direction map in the local vicinity of the aerial vehicle. This is advantageous at the crop canopy—air boundary where the crop canopy may interfere with the LIDAR detection.

Another embodiment of the invention relates to a system comprising the aerial vehicle of the invention and a base station. The base station may comprise a wireless or wired interface to other components such as e.g. a weather station and/or a LIDAR sensor e.g. set at the edge of the field. This has the advantage of being able to plan necessary actions well ahead of the aerial vehicle, particularly where landscape features (e.g., high hedges, rolling fields) would interfere with the line of sight needed for LIDAR. It also means that a high-resolution map of weather conditions across the field can be built up in the absence of the aerial vehicle, facilitating future planning.

Figure 2:
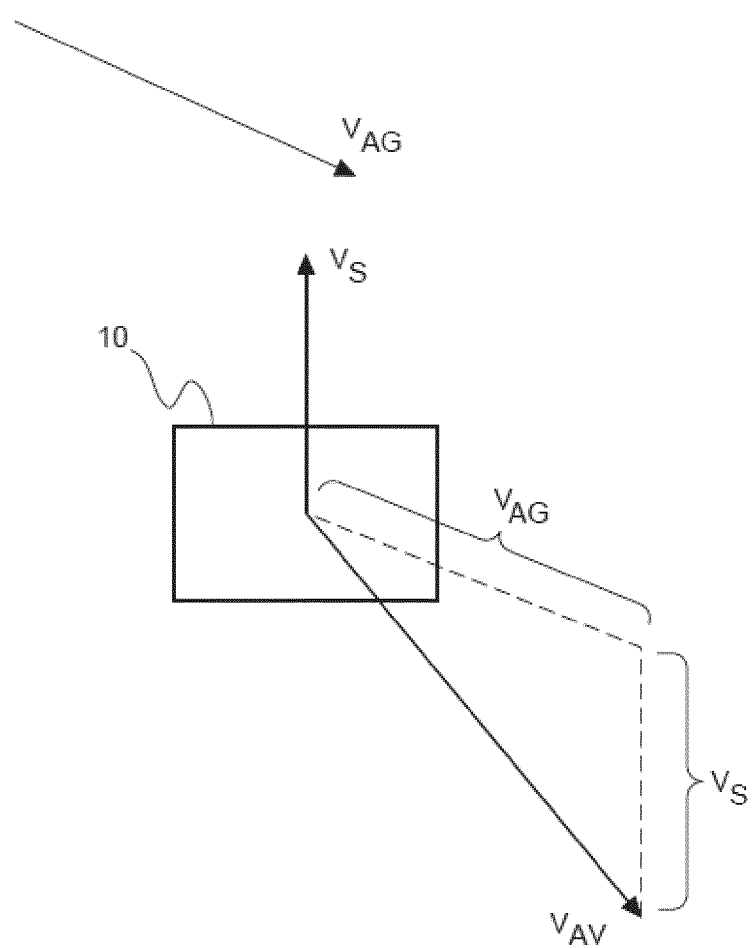
FIG. 2 shows a schematic example of a plan view of an aerial vehicle.

FIG. 2 shows a plan view of an exemplar aerial vehicle 10 flying over and spraying a crop in a field. The aerial vehicle is flying close to, and parallel to, a boundary of the field, and the wind is blowing with a component towards the boundary. The vehicle is flying with a speed $V_S$ and the wind is blowing in a particular direction and with a velocity $V_{AG}$. The aerial vehicle has a LIDAR sensor to determine the direction, distance and speed of the wind with respect to the aerial vehicle (based on the detection of the movement of airborne particles over time),—in other words in the reference from of the aerial vehicle. Due to the movement of the aerial vehicle, the measured wind direction, distance and wind speed have both been distorted from their true ground-based values, as shown. Thus, the wind speed measured at the aerial vehicle has been distorted to $V_{AV}$. A vector-based analysis can however be used to determine the real ground-based wind direction, distance and wind speed. In this way, the component of the wind speed towards the boundary of the field, in terms of the ground, can be determined. Then, the processing unit of the aerial vehicle can position its liquid spray units closer to the ground or crop if the wind is too strong and its direction and distance would lead to lateral drift, and/or the processing unit can control the liquid spray units themselves, to spray larger drops that are less susceptible to drift or angle the liquid spray units into the wind. The aerial vehicle can also move horizontally towards the upwind direction in order to avoid drift to unwanted areas. The absolute velocity of the vehicle with respect to the sprayed liquid has been found to be not particularly important. This is because the sprayed liquid initially sprayed has a forward velocity equal to that of the aerial vehicle, but the spray is very rapidly slowed down and then falls under gravity at a speed governed by drag from the air and is globally carried by the moving air—the wind. However, the sprayed liquid can also be entrained by a downwash of air from the rotor blades of the aerial vehicle.

Thus, the following situations can apply, and where the aerial vehicle takes appropriate action in order to mitigate the effects of spray drift. Thus, the wind has a wind speed that has a component blowing perpendicular to the vehicle's forward direction. This component of wind speed is $V_{AG1}$. The processing unit has flown the aerial vehicle slightly downwards. This measure has been determined to be optimal in that spray drift has been determined not to be problematic and will not be blown over the boundary. The wind is however increasing in terms of wind speed, and now the component of the wind speed perpendicular to the forward direction has increased to a value $V_{AG2}$. In this example, the processing unit mitigates the effect of drift to unwanted areas, that would otherwise occur, by heading the aerial vehicle more towards an upwind position, where it has been determined that there will be less drift to unwanted areas. As the wind gusts further to a cross component having a speed $V_{AG3}$, the processing unit determines that the aerial vehicle cannot move closer to the ground or more towards an upwind position, and therefore controls the liquid spray units to spray droplets having a larger size. These more massive droplets have increased mass with respect to their cross-sectional area and fall faster under gravity than smaller droplets and therefore do not get carried as far laterally with the wind before they reach the ground or crop, thereby mitigating spray drift.

Figure 3:
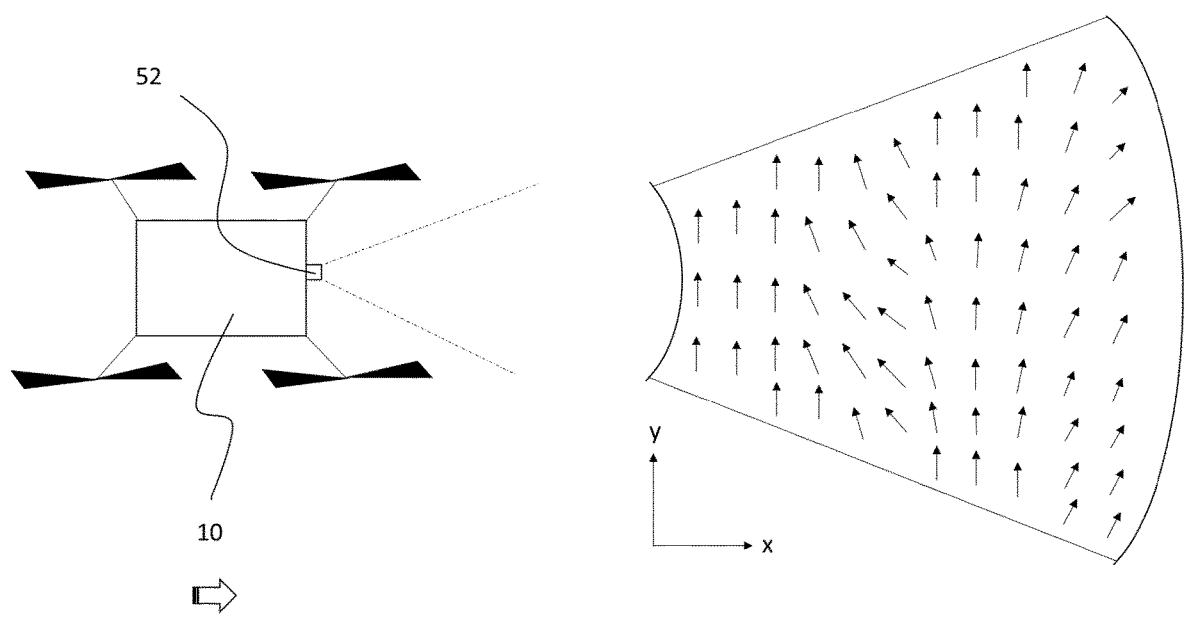
FIG. 3 shows a schematic example of a plan view of an aerial vehicle and a 3D air movement speed and air movement direction map.

FIG. 3 shows a schematic example of a plan view of an aerial vehicle and a 3D air movement speed and air movement direction map. The aerial vehicle 10, exemplary represented by a quadrocopter, flies in the direction of the arrow as depicted on the left below the aerial vehicle. The LIDAR sensor 52 of the aerial vehicle senses information about the speed, direction and distance of airborne particles relative to the aerial vehicle with respect to a fore-aft axis of the aerial vehicle (and over time). Together with the information of the speed of the aerial vehicle relative to the ground the processing unit determines a 3D air movement speed and air movement direction and distance map in all three dimensions ahead of the vehicle. In FIG. 3 only two dimensions are shown on the right (arrows extending in the direction of the x- and y axis). The length of an arrow correlates with the movement speed of the wind (air movement) and the direction of an arrow correlates with the movement direction of the wind (air movement) at a certain spatial position. The position of the arrows within the vision cone of the LIDAR sensor data correlates with the wind (air movement) distance. The 3D air movement speed and air movement direction and distance map which is continuously updated is used for flying operations of the aerial vehicle and/or to control the liquid spray unit.

Figure 4:
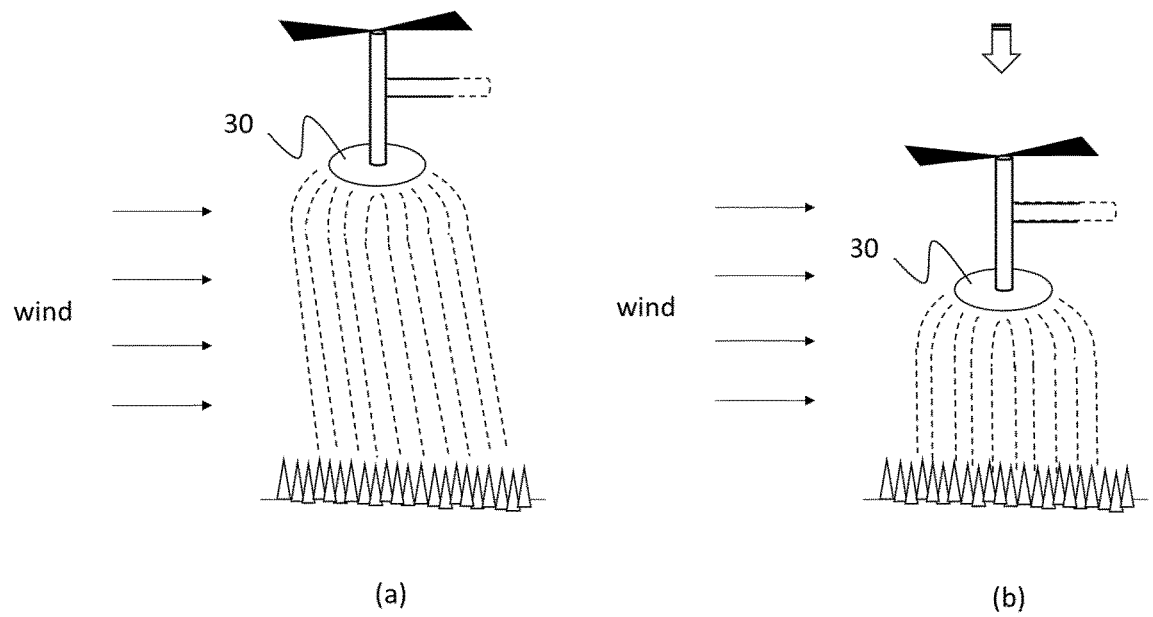
FIG. 4 shows schematic example of a spinning disc as part of an aerial vehicle and the influence of the height of the spinning disc on spray drift.

FIG. 4 shows schematic example of a spinning disc as an example of a liquid spray unit 30 as part of an aerial vehicle and the influence of the height of the spinning disc 30 on spray drift. The spinning disc is located below a propeller of the aerial vehicle and the dotted lines indicate a connection to other parts of the aerial vehicle (not shown). In example (a), spray drift occurs as the aerial vehicle flies too high above the ground or crop relative to the indicated wind speed, direction and distance. In example (b), spray drift is reduced as the aerial vehicle flies at a reduced height above the ground or crop relative to the indicated wind speed, direction and distance. In this example, the droplet size of the sprayed liquid of example (a) and example (b) is the same.

Figure 5:
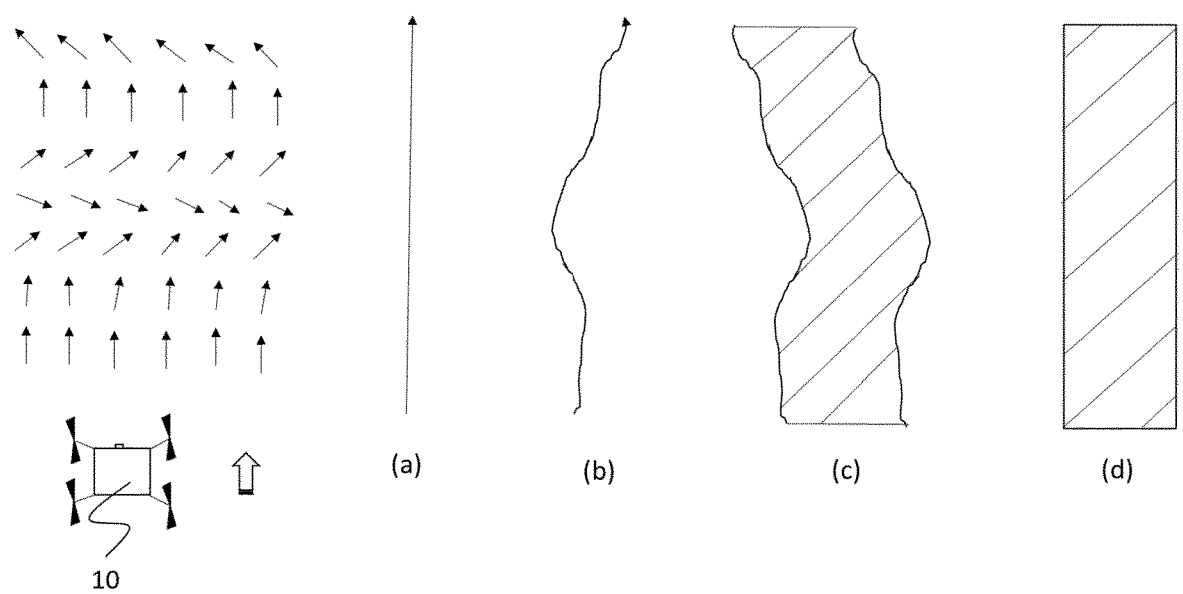
FIG. 5 shows a schematic example of a plane view of flying routes of an aerial vehicle with and without flight path corrections from a 3D air movement direction and air movement speed map.

FIG. 5 shows a schematic example of a plane view of flying routes of an aerial vehicle with and without flight path corrections from a 3D air movement direction, distance and air movement speed map. The aerial vehicle 10, exemplary represented by a quadrocopter, flies in the direction of the arrow as depicted on the left. In example (a) a flight route is shown without any flight route corrections due to local air movement direction, distance and air movement speed. The spray swath deposition on the crop field of this flight route is depicted in (c). In example (b) a flight route is shown with flight route correction (e.g. corrections in the horizontal position of the aerial vehicle) due to local air movement direction, distance and air movement speed. The spray swath deposition on the crop field of this flight route is depicted in (d). It is more precise than the spray swath deposition as shown in (c).

FIG. 6 shows a schematic example of a spinning disc as an example of a liquid spray unit 30 as part of an aerial vehicle and the influence of the change of rotational speed of the spinning disc on the droplet size of the sprayed liquid. The spinning disc is located below a propeller of the aerial vehicle and the dotted lines indicate a connection to other parts of the aerial vehicle (not shown). On the left the rotational speed of the spinning disc 30 is high (high $v_r$) and fine droplets are sprayed. On the right the rotational speed of the spinning disc 30 is low (low $v_r$) and coarse droplets are sprayed.

FIG. 7 shows a schematic example of the influence of droplet size of the sprayed liquid on spray drift. The spinning disc as an example of a liquid spray unit 30 is located below a propeller of an aerial vehicle and the dotted lines indicate a connection to other parts of the aerial vehicle (not shown). With coarse droplets produced by the spinning disc 30 there is less drift in comparison to fine droplets produced by the same spinning disc 30 (with a higher rotational speed of the spinning disc) under similar wind conditions.

Figure 8:
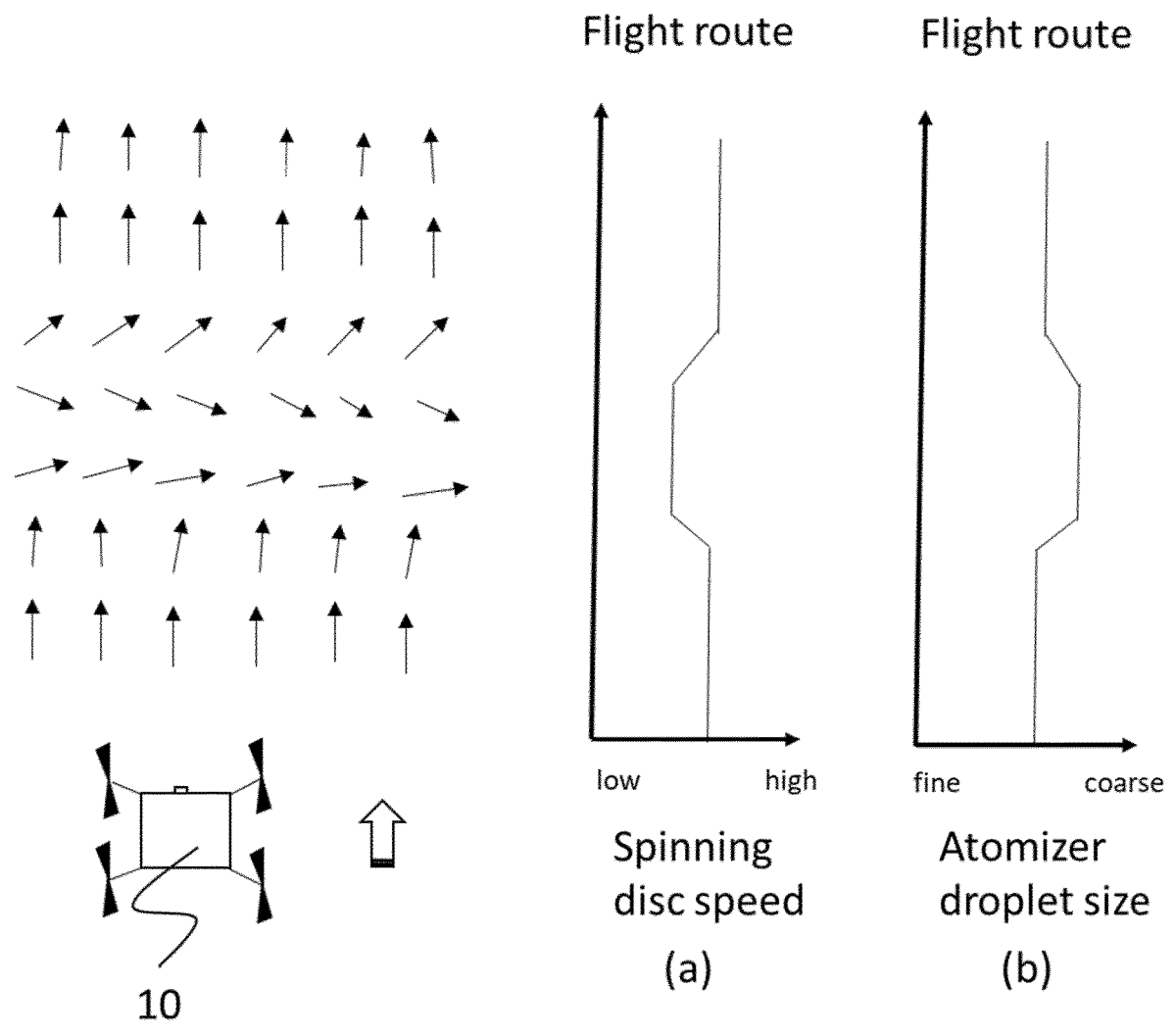

FIG. 8 shows a schematic example of a plane view of a flying route of an aerial vehicle and the adjustment of the rotational speed of the spinning disc and the droplet size of the sprayed liquid during flight. The aerial vehicle 10, exemplary represented by a quadrocopter, flies in the direction of the arrow as depicted on the left. In (a) it is shown how the spinning disc speed is corrected during the flight route. At spatial positions where higher air movement direction and air movement speed occurs the speed of the spinning disc is lowered which results in coarser liquid spray droplets sprayed as shown in (b).

Figure 9:
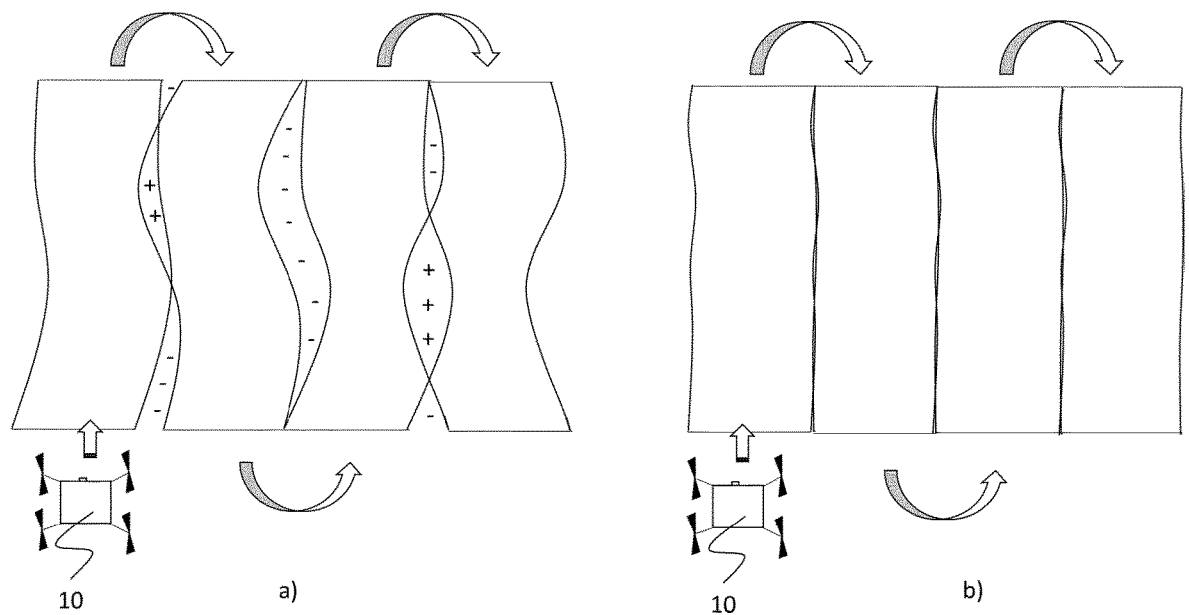
FIG. 9 shows a schematic example of a plane view of flying routes of an aerial vehicle and spraying product deposition swaths with and without 3D air movement direction and air movement speed map corrections.

FIG. 9 shows a schematic example of a plane view of flying routes of an aerial vehicle and spraying product deposition swaths with and without 3D air movement direction, distance and air movement speed map corrections. In example (a) the aerial vehicle 10, exemplary represented by a quadrocopter, flies in the direction of the arrows as depicted without any flight route corrections based on the 3D air movement direction, distance and air movement speed map. As a results many areas of spray liquid depositions result that have either no deposition (indicated in the figure with the symbol "−") or two spray liquid depositions (indicated in the figure with the symbol "+". In example (b), the aerial vehicle 10 flies in the direction of the arrows as depicted with flight route corrections based on the 3D air movement direction, distance and air movement speed map. As a result, thereof almost no areas of spray liquid depositions occur that have either no deposition or too much deposition.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. An aerial vehicle, comprising:
   a liquid chemical tank;
   at least one liquid spray unit;
   at least one actuator;
   a plurality of sensors; and
   a processing unit;

wherein, the liquid chemical tank is configured to hold a liquid chemical;

wherein, the at least one liquid spray unit is configured to spray the liquid chemical;

wherein, the at least one actuator is configured to operate the at least one liquid spray unit;

wherein, at least one sensor of the plurality of sensors is configured to measure a speed of the aerial vehicle relative to the ground;

wherein, at least one sensor of the plurality of sensors is a light detection and ranging (LIDAR) sensor configured to measure the distance, direction and speed of airborne particles relative to the aerial vehicle with respect to a fore-aft axis of the aerial vehicle;

wherein, the processing unit is configured to receive and analyse the sensor data from the plurality of sensors to determine an air movement direction and distance relative to a projection of the fore-aft axis onto the ground and to determine an air movement speed relative to the ground, the determination comprising utilisation of the speed of the aerial vehicle, the direction and distance of airborne particles relative to the aerial vehicle with respect to the fore-aft axis of the aerial vehicle and the speed of airborne particles relative to the aerial vehicle; and wherein, the processing unit is configured to control at least one flying operation of the aerial vehicle and/or control the at least one actuator, wherein determination of at least one instruction for the control of the at least one flying operation of the aerial vehicle and/or determination of at least one instruction for the control the at least one actuator comprises utilisation of the determined air movement direction and distance relative to the projection of the fore-aft axis onto the ground and the determined air movement speed relative to the ground.

2. The aerial vehicle according to claim 1, wherein control of the at least one flying operation comprises varying a height of the aerial vehicle above the ground or crop or the horizontal position which extends in a direction perpendicular to the fore-aft axis of the aerial vehicle above the ground or crop.

3. The aerial vehicle according to claim 1, wherein at least one sensor of the plurality of sensors is configured to provide data from which a height of the aerial vehicle above the ground or crop can be determined, and wherein the processing unit is configured to fly the aerial vehicle to a height above the ground or crop that depends on a magnitude of the determined air movement speed relative to the ground.

4. The aerial vehicle according to claim 3, wherein the processing unit is configured to fly the aerial vehicle at a height above the ground or crop and/or to fly the aerial vehicle to a horizontal position above the ground or crop depending on a magnitude of an air direction angle of the determined air movement direction relative to the projection of the fore-aft axis onto the ground.

5. The aerial vehicle according to claim 4, wherein the height above the ground or crop at which the aerial vehicle is flown is calculated on the basis of the air movement speed relative to the ground multiplied by the cosine of the air direction angle.

6. The aerial vehicle according to claim 4, wherein the horizontal position above the ground or crop at which the aerial vehicle is flown is determined at least in part on the air movement speed relative to the ground multiplied by the cosine of the air direction angle.

7. The aerial vehicle according to claim 1, wherein at least one sensor of the plurality of sensors is configured to provide data from which a horizontal position which extends in a direction perpendicular to the fore-aft axis of the aerial vehicle above the ground or crop can be determined, and wherein the processing unit is configured to fly the aerial vehicle to the horizontal position above the ground or crop that depends on a magnitude of the determined air movement speed relative to the ground.

8. The aerial vehicle according to claim 7, wherein the processing unit is configured to fly the aerial vehicle at a height above the ground or crop and/or to fly the aerial vehicle to a horizontal position above the ground or crop depending on a magnitude of an air direction angle of the determined air movement direction relative to the projection of the fore-aft axis onto the ground.

9. The aerial vehicle according to claim 1, wherein the at least one actuator comprises at least one activation actuator configured to start the at least one liquid spray unit spraying the liquid chemical and configured to stop the at least one liquid spray unit spraying the liquid chemical.

10. The aerial vehicle according to claim 9, wherein the processing unit is configured to control one or more of the at least one activation actuator to stop an equivalent number of liquid spray units from spraying the liquid chemical based at least in part on a magnitude of the determined air movement speed relative to the ground.

11. The aerial vehicle according to claim 1, wherein the at least one actuator comprises at least one spray adjustment actuator configured to control a droplet size of the liquid chemical sprayed by the at least one liquid spray unit.

12. The aerial vehicle according to claim 11, wherein the processing unit is configured to control one or more of the at least one spray adjustment actuator to control the droplet size of the liquid chemical sprayed by an equivalent number of liquid spray units based at least in part on a magnitude of the determined air movement speed relative to the projection of the fore-aft axis of the aerial vehicle onto the ground.

13. The aerial vehicle according to claim 12, wherein the processing unit is configured to increase the droplet size on the basis of an increase in the magnitude of the determined air movement speed relative to the ground.

14. The aerial vehicle according to claim 11, wherein the processing unit is configured to control one or more of the at least one spray adjustment actuator to control the droplet size of the liquid chemical sprayed by an equivalent number of liquid spray units based at least in part on a magnitude of an air direction angle of the determined air movement direction relative to the projection of the fore-aft axis of the aerial vehicle onto the ground, and wherein the air direction angle is the angle between the determined air movement direction relative to the projection of the fore-aft axis of the aerial vehicle onto the ground and the projection of the fore-aft axis of the aerial vehicle onto the ground.

15. The aerial vehicle according to claim 14, wherein the droplet size is determined at least in part on the air movement speed relative to the ground multiplied by the cosine of the air direction angle.

16. The aerial vehicle according to claim 1, wherein the aerial vehicle further comprises at least one sensor configured to acquire at least one image above the ground or crop.

* * * * *